United States Patent
Lawson

[11] Patent Number: 6,042,873
[45] Date of Patent: *Mar. 28, 2000

[54] PET CHEW AND METHOD FOR MAKING

[75] Inventor: Richard L. Lawson, Sanger, Calif.

[73] Assignee: Products Carousel, Incorporated, Sanger, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/829,373

[22] Filed: Mar. 31, 1997

Related U.S. Application Data

[60] Provisional application No. 60/030,237, Oct. 29, 1996.

[51] Int. Cl.⁷ ........................................ A23K 1/10
[52] U.S. Cl. .................. 426/657; 426/517; 426/519; 426/535; 426/646; 426/805
[58] Field of Search ..................... 426/657, 516, 426/805, 519, 517, 535, 646

[56] References Cited

U.S. PATENT DOCUMENTS

| | | |
|---|---|---|
| 1,670,812 | 5/1928 | Kipp, Jr. . |
| 2,189,711 | 2/1940 | Eigenbrot . |
| 2,207,903 | 7/1940 | Strause . |
| 2,225,095 | 12/1940 | Beverly . |
| 2,355,050 | 8/1944 | Borton . |
| 2,950,870 | 8/1960 | Danyluke . |
| 4,198,440 | 4/1980 | Le Jeune ................................. 426/805 |
| 4,236,676 | 12/1980 | Bialski et al. . |
| 4,252,280 | 2/1981 | Rymer . |
| 4,260,635 | 4/1981 | Fisher ..................................... 426/805 |
| 4,262,028 | 4/1981 | Meyer et al. ........................... 426/417 |
| 4,332,832 | 6/1982 | Buckley et al. ........................ 426/805 |
| 4,593,614 | 6/1986 | Berge et al. . |
| 4,880,642 | 11/1989 | Berends . |
| 5,057,333 | 10/1991 | Lawson .................................. 426/480 |
| 5,397,587 | 3/1995 | Thompson et al. ..................... 426/557 |

*Primary Examiner*—Milton Cano
*Assistant Examiner*—Hao Mai
*Attorney, Agent, or Firm*—Townsend and Townsend and Crew LLP

[57] ABSTRACT

Pet chews (140, 141) are made from pieces of cleaned cattle hooves (10) by reducing the hoof pieces to a range of particulate sizes, such as by tumbling the pieces of hooves within a rotary chipping drum (62). The particulate hoof material (30) is separated by size at a shaker table assembly (104). Several sizes (A–E) of particulate hoof material are combined in chosen proportions with a collagen protein binder (144) and formed into the pet chews, typically by compression or by extrusion, having appropriate strength, hardness and toughness.

21 Claims, 4 Drawing Sheets

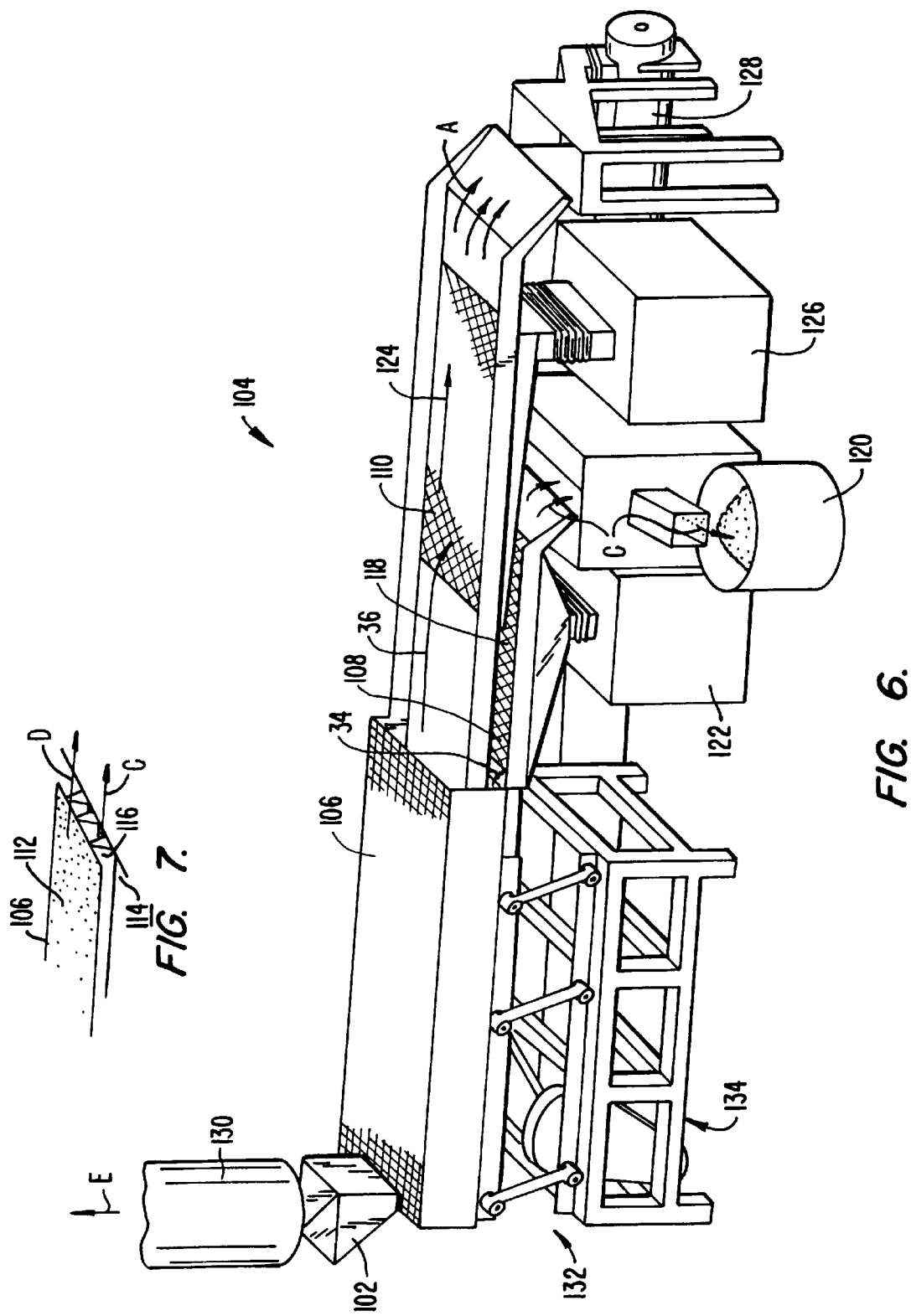

PET CHEW AND METHOD FOR MAKING

CROSS-REFERENCE TO RELATED APPLICATIONS

This application claims the benefit of U.S. Provisional Application No. 60/030,237, filed Oct. 29, 1996, the disclosure of which is incorporated herein by reference.

BACKGROUND OF THE INVENTION

Chew toys for dogs are made from many different materials. Some have no nutritional value and are intended to be chewed for a very long time before the chew toy is exhausted. Examples include chew toys made from hard nylon, hard rubber and treated bones. Other chew toys are intended to be chewed for a shorter period of time (for typical dogs); these are often made from animal parts and include rawhide chew toys, processed cattle hooves and processed pigs' ears.

During the processing of cattle hooves, the hooves are often trimmed for aesthetic and safety reasons. These left over trim pieces are not, however, suitable for use as dog chews. Therefore, the remaining pieces are often sold in bulk for further processing, such as to produce gelatin. U.S. Pat. No. 5,057,333, the disclosure of which is incorporated by reference, recognized that the present uses for the pieces of hooves left over from processing cattle hooves to create dog chews are poor uses from an economical standpoint. That patent discloses an economically advantageous use of the trimmed pieces of cattle hooves by reducing the trimmed pieces to a granular hoof material for use as a flavor enhancer in pet food.

SUMMARY OF THE INVENTION

The present invention is directed to a pet chew made from particulate hoof material. A range of sizes of particulate hoof material is formed together with a binder to create the pet chew. The proportions of each size of particulate hoof material are chosen to achieve strength, to form a smooth surface of the finished pet chew and to minimize the amount of expensive binder which is needed. It is believed that the larger size particles provide strength while the smaller size particles fill in voids to enhance the strength of the pet chew and to reduce the amount of adhesive needed. A preferred type of adhesive used is a digestible collagen protein product having powerful binding properties.

The particulate hoof material is made from appropriately cleaned hooves, typically cattle hooves and pieces of cattle hooves, by reducing the hooves to particulate hoof material. This can be carried out by tumbling pieces of the hooves and/or hoof pieces within a rotary drum having louvered openings formed in the circumferential sidewall of the drum. The inwardly opening louvered openings have sharpened cutting edges. The pieces of hooves fall against the cutting edges and are chipped by the cutting edges. The chipped pieces of hooves (the particulate hoof material) pass through the louvered openings and are passed to, for example, a shaker table assembly where particulate hoof material is separated by size.

The shaker assembly separates the particulate hoof material into at least four, and preferably five, sizes of particulate hoof material. Different sizes of hoof material are combined with the binder to make the pet chews.

To make pressed pet chews, the combined hoof material and binder can be pressed into the desired shape using a hydraulic press. Extruded pet chew sticks can be made by extruding the combined hoof material and binder.

A primary advantage of the invention is that it permits the hoof pieces to be converted to an economically advantageous form by reducing the size of the pieces to a particulate hoof material. The product is nutritious and because it cannot splinter, as can bones, safe to use.

Binder is expensive, so it is important to use only as much binder as is required to produce a good product. The proportion of different particle sizes and amount of binder that needs to be used is affected by the amount of moisture in the hoof material, the selection and proportions of particle sizes, and the processing procedure (typically pressing or extrusion) used. Larger size particles can be used when the pet chews are made by pressing; extrusion may require that smaller size particles be used.

Therefore, the amount of binder used may be adjusted for each batch so a minimum amount of binder is used to reduce product costs. The minimum amount usable may be found by trial and error, within general limits.

Other features and advantages of the invention will appear from the following description in which the preferred embodiment has been set forth in detail in conjunction with the accompanying drawings.

BRIEF DESCRIPTION OF THE DRAWINGS

FIG. 6 is a simplified overall view of the shaker table assembly used with the method of FIG. 1;

FIG. 7 is an enlarged, simplified view of first sifter screen of the shaker table assembly of FIG. 6.

DETAILED DESCRIPTION OF THE PREFERRED EMBODIMENT

Figure 1:
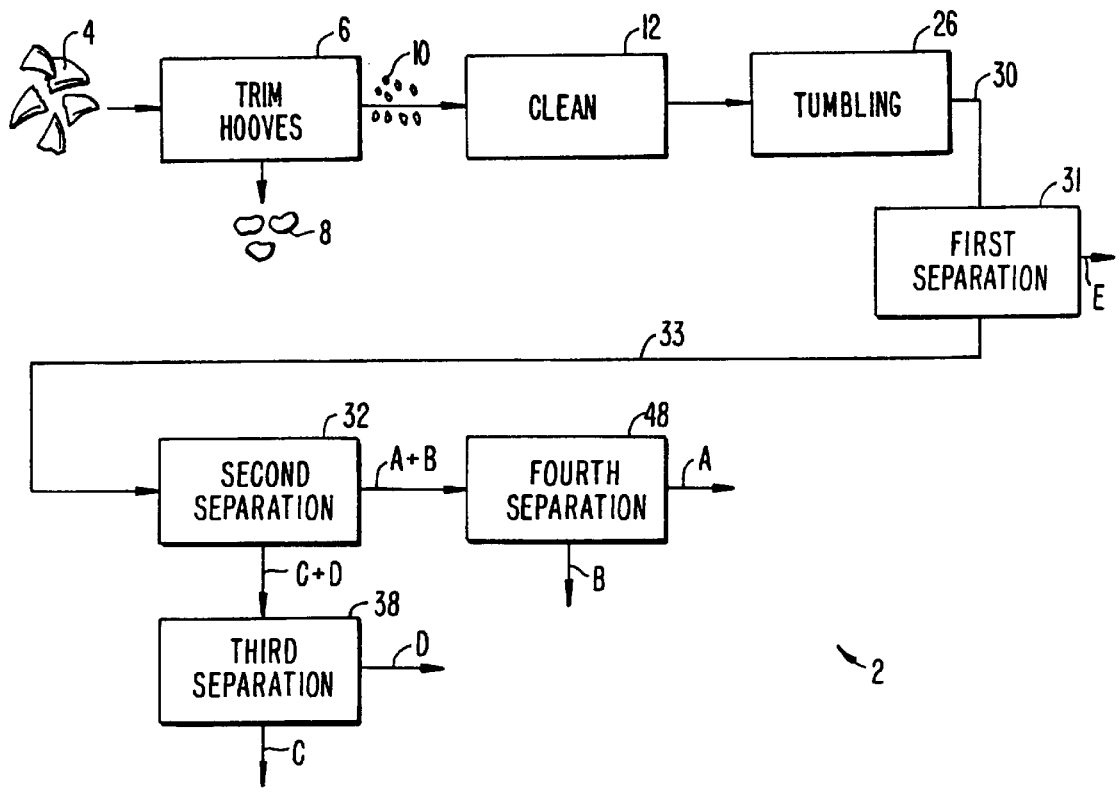
FIG. 1 is a flow diagram showing the steps for making five sizes of particulate hoof material.

FIG. 1 illustrates, in a schematic flow chart form, a system or method 2 for making five sizes of particulate hoof material. System 2 begins with cattle hooves 4 which are trimmed at trim station 6 to create trimmed hooves 8 and hoof trim pieces 10. Hoof trim pieces 10 are then cleaned at cleaning stage 12 in a manner similar to used to clean trimmed hooves 8. This trimming and hoof cleaning activity is described in U.S. patent application Ser. No. 07/443,457 filed Nov. 29, 1989, for Dog Chew Processing Method, now U.S. Pat. No. 4,985,964, the disclosure of which is incorporated by reference.

Figure 2:
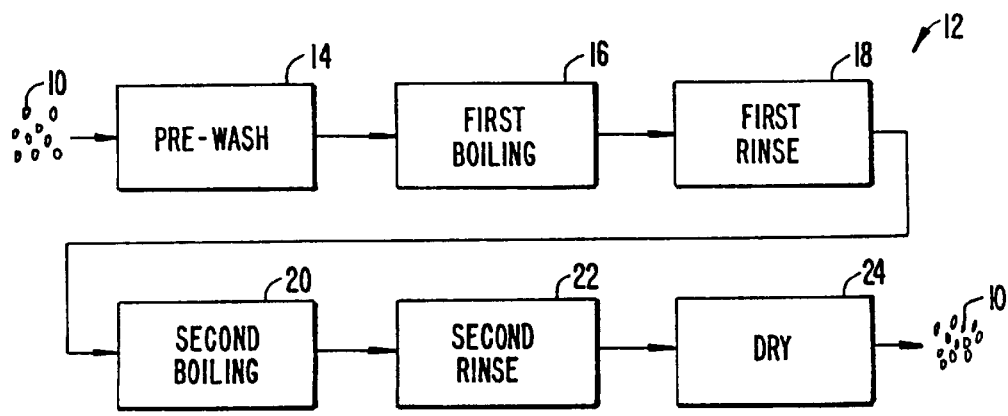
FIG. 2 is a flow diagram illustrating the steps taken to clean the hoof trim pieces of FIG. 1.

At cleaning stage 12, shown in more detail in FIG. 2, hoof trim pieces 10 are sent to a prewash step 14 where the hoof trim pieces are prewashed three times in water at 180° F. for 15 minutes duration each. Hoof trim pieces 10 are then passed through a first boiling step 16 at which the hooves are boiled in water for 15 minutes at 212° F. Next, pieces 10 are rinsed in cold water for 10 minutes at rinse step 18 and are then boiled in a solution of 100 parts water to 1 part peroxide for 10 minutes at 212° F. at second boiling step 20. Thereafter, hoof trim pieces 10 are rinsed for 15 minutes in water at 180° F. at second rinse step 22. Hoof trim pieces 10 are then dried in a hot chamber at 180° F. for 96 hours at dry step 24 to create washed and dried hoof trim pieces.

Figure 3:
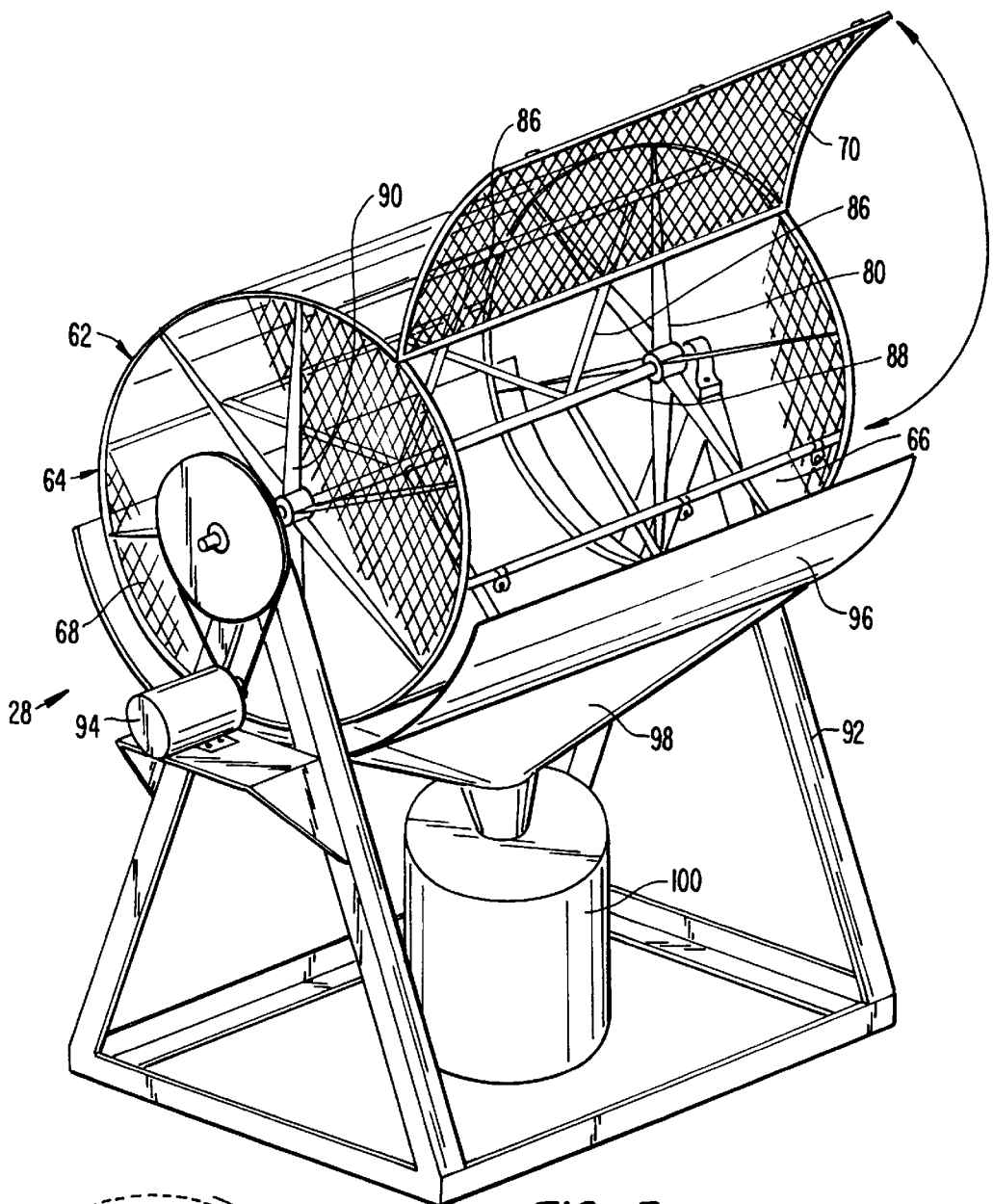
FIG. 3 is a simplified perspective view showing a tumbler used with the tumbling step of FIG. 1 with the chip plate removed for clarity.

Returning now to FIG. 1, pieces 10 are reduced in size at a tumbling step 26 using tumbler 28 shown in FIG. 3. The construction and operation of tumbler 28 will be described below. The purpose of tumbler 28 is to create a range of sizes of particulate hoof material 30 generally ranging in size from about 0.127 inch to about 0.0045 inch.

Particulate hoof material is, in this preferred embodiment, categorized and separated into five size ranges: large size A (about 0.0625 to 0.127 inch), medium large size B (about 0.0468 to 0.0625 inch), medium size C (about 0.0312 to 0.0468 inch), medium small size D (about 0.0045 to 0.0312 inch) and small size E (about 0.0045 inch and smaller). (These sizes A–E correspond generally to sieve sizes 16, 30, 50, 100 and 200, respectively.) First separation step 31 separates small size particulate hoof material E from the remainder 33 of particulate hoof material. At second separation step 32, medium C and medium small D particulate hoof material is separated from large A and medium large B particulate hoof material. Medium C and medium small D particulate hoof material is then further separated at a third separation step 38 into medium C and medium small D particulate hoof material. Large A and medium large B particulate hoof material are separated at a fourth separation step 48.

Figure 4:
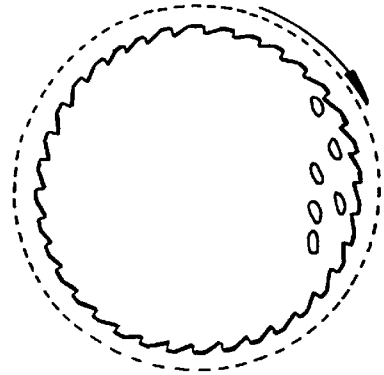
FIG. 4 is a simplified cross-sectional view of the drum of FIG. 3 illustrating the tumbling action of the hoof trim pieces and the cutting action of the sharpened leading edges of the chip plate on the inside of the drum.
Figure 5:
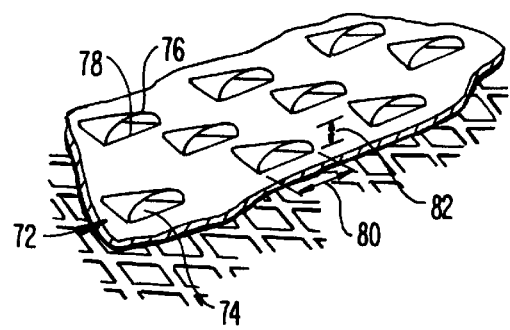
FIG. 5 is an enlarged illustration of the louvered chip plate and structural mesh used with the drum of FIG. 3.

Turning now to FIGS. 3–5, tumbler 28 will be described in more detail. Tumbler 28 includes a double-walled cylindrical drum 62 made of a rigid framework 64 covered at its cylindrical periphery 66 and circular ends 68 by diamond plate screen 70. Diamond plate screen 70 has a mesh size of about 0.5 inch. Louvered chip plate 72 (not shown in FIG. 3 for clarity) is mounted on the inside of diamond plate screen 70 around substantially the entire periphery 66. Chip plate 72 has numerous louvered openings 74 created by sharpened leading edges 76 and base edges 78 of chip plate 72. Chip plate 72 is made of stainless steel about 0.25 inch thick. Louvered openings 74 have widths 80 of about 0.25 inch and heights 82 of about 0.25 inch. Leading edges 76 are sharpened using a disc grinder.

Tumbler 28 includes two sets of agitators 86 which extend radially from a center shaft 88. End agitators 90 extend radially from center shaft 88 adjacent ends 68 of drum 62. Drum 62 is supported by a support frame 92 and is driven by a motor and pulley arrangement 94 at about 30 RPM. Tumbler 28 also includes a chip catcher 96 underlying drum 86 having a funnel section 98 which directs chipped hoof material 30 into a chip collector drum 100.

Chipped hoof material 30 from chip collector 100 is dumped into a material inlet 102 of a shaker table assembly 104, shown in FIG. 6. A dust exhaust 130 overlies material inlet 102 and is used to separate small size E particulate hoof material during first separation step 31. Small size E, also called dust, are particles smaller than medium-small size D particulate hoof material. Small size E particles are small enough to become entrained in the upward movement of air through dust exhaust 130. Shaker table assembly 104 includes first, second and third sifter screens 106, 108, 110 corresponding to second separation step 32, third separation step 38 and fourth separation step 48. First sifter screen 106, shown in more detail in FIG. 7, includes an 18×16 mesh surface 112 supported above a solid bottom surface 114 by angled supports 116. Medium C and medium small D particulate hoof material 34 passes through mesh surface 112 and along surface 114 until reaching second sifting screen 108. Large A and medium large B particulate hoof material is too large to pass through mesh surface 112 but continues on to third sifter screen 110. Second sifter screen 108 includes a 60-mesh surface 118 to permit medium small D particulate hoof material to pass through it while the medium C particulate hoof material exits second sifting screen 108 to be collected at a medium size material collector 120. To enhance the collection of medium small D size material, collector 122 uses a fan to pull air, and medium small size D material therewith, through 60 mesh screen 118.

Third sifter screen 110 includes a 14×16 mesh surface 124 which separates medium large B size hoof material from large A size hoof material. Medium large B size hoof material is collected at a collector 126. Large A size particulate hoof material is directed away from assembly 104 through the use of a return auger 128.

First, second and third sifter screens 106, 108 and 110 are driven in a conventional manner using a belt-driven rocker arm assembly 132 mounted to a drive frame 134. Assembly 132 causes sifter screens 106, 108, 110 to vibrate a total of 0.5 inch at a rate of 416 cycles per minute.

Figure 8:
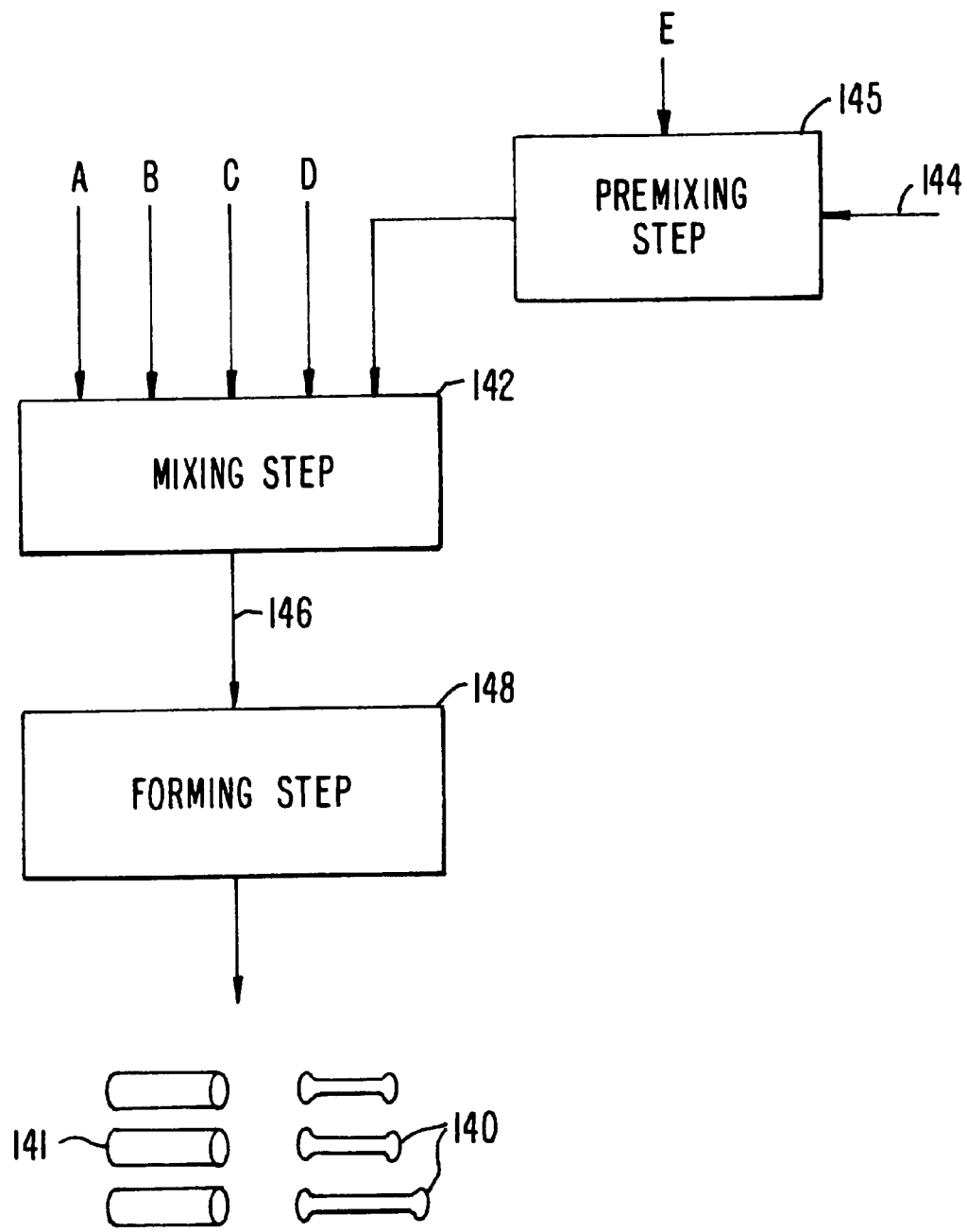
FIG. 8 is a flow diagram showing how the particulate hoof material of FIG. 1 is processed to create a pet chew according to the invention.

FIG. 8 illustrates, in schematic form, the method by which the different sizes A–E of particulate hoof material are combined to create pet chews 140, 141. In one example for making pressed bone-shaped pet chews 140, mixing step 142 uses five different sizes A–E of particulate hoof material are mixed with a binder 144 in the following proportions: 20% by weight of size A, 5% by weight of size B, 10% by weight of size C, 60% by weight of size D and 5% by weight of size E. Binder 144 is preferably a digestible collagen protein binder. A preferred binder is sold by ESCHEM, Inc. of Chicago, Ill. as 40 MEGA SPECIAL—FEEDBINDERS COLLOID. The particulate hoof materials A–E must have a moisture content of between about 7% and 10% for use with binder 144. Binder 140 is preferably used at a rate of between amount 100 to 110 pounds per 1000 pounds of particulate hoof material; the amount of binder depends primarily on the proportions and moisture content of particulate hoof materials A–E. A pre-mixing step 145 is used to pre-mix binder 144 and the smallest size hoof material E to ensure material size E (similar to dust) is thoroughly wetted with binder; this takes about 45 minutes at a temperature of about 90°–110° F. Mixing step 142 takes place at about 170–180° F. for about five minutes. A preferred mixing apparatus is a ribbon mixer made by Leland Detroit Mfg. Co. of Detroit, Mich. After the components have been mixed at mixing step 142, the component/binder mixture 146 is then processed at forming step 148. In this example, forming takes place using a 75-ton press to make seven-inch-long pet chews 140 one at a time. The pressing time within the die is about 1.2 seconds. The forming step typically takes place with the dies at a temperature of about 90° F. to 110° F. to keep the binder from setting up prematurely. The pressed pet chews 140 can be in a variety of shapes other than bone-shaped.

Pet chews 141, made by extrusion, are typically generally cylindrical. The particle sizes may be the same as discussed above. The average particle sizes used for extrusion may also be smaller than those used to form pet chews 140 due to, for example, the requirements of the extrusion equipment. Exemplary extrusion equipment are designed to form pet chews 141 in sizes ranging from 0.25 inch to 1 inch diameter at pressures of about 1750 to 1900 psi. The extrusion die is maintained at about 90°–110° F. to keep the binder from setting up prematurely. The binder is used at a rate from about 100 to 110 pounds per 1000 pounds of particulate hoof material.

In making pet chews 140 several issues must be addressed. The first is that a range of sizes of particulate hoof material must be used. The larger size particles are used primarily for strength while the smaller size particles are used to help fill in the cracks and ensure that the product binds together well. Also, for the product to have a smooth surface it is necessary to use small E size particulate hoof material. In addition to filling holes and making a stronger product, the intermediate and smaller size particles reduce the amount of binder needed. Since binder is quite expensive, this is an important consideration.

The amount of binder used for the mix will vary depending upon particular proportions of particulate hoof material, the moisture content of the particular hoof material and the forming process used. The above examples describe proportions which have been used to make high quality pet chews 140, 141. However, experimentation will typically be needed to determine the optimal amount of binder and the optimal proportions of particulate matter sizes needed for the particular press or extruder used. For example, it may be desired to eliminate particle size A and increase particle size D by the same amount. Also, the moisture content of the particulate material should be monitored to permit the optimal amount of binder to be used for each batch.

The mix of particle sizes, choice of binder, amount of binder and the forming step used determine the strength, hardness and toughness of the pet chew. The pet chew must not be brittle but tough enough to withstand rough treatment by pets and not tend to break into large chunks when chewed. Sample pet chews 141 were tested for strength by clamping opposite ends of the pet chew and then bending the pet chew until the pet chew snapped at what is termed a splitting load. Sample extruded, cylindrical pet chews 141 having a diameter of about 0.94 inch and a length of about three inches snapped at a splitting load of about 950 pounds. Other proportions of particles and binders may also be used to create a suitable pet chew having the desired strength, hardness and toughness.

Modification and variation can be made to the disclosed embodiment without departing from the subject of the invention as defined in the following claims. For example, particulate hoof material 30 could be transported from tumbler 28 to material inlet 102 in a continuous process rather than a batch process. Hooves 4 could be used instead of or in addition to hoof trim pieces 10 in tumbler 28. The sizes and proportions of sizes of particulate hoof material could be varied from the above examples.

What is claimed is:

1. A formed hoof material pet chew comprising:
   a hoof material particulate component comprising a range of particle sizes up to about 0.127 inch, wherein said particulate component comprises 5% by weight size E (about 0.0045 inch and smaller) hoof material;
   a binder binding said particulate components into a shape.

2. The pet chew according to claim 1 wherein said particulate component further comprises:
   about 20% by weight size A (about 0.0625 to 0.127 inch) hoof material;
   about 5% by weight size B (about 0.0468 to 0.0625 inch) hoof material;
   about 10% by weight size C (about 0.0312 to 0.0468 inch) hoof material; and
   about 60% by weight size D (about 0.0045 inch to 0.0312 inch) hoof material.

3. The pet chew according to claim 1 wherein said particulate component further comprises:
   about 5% by weight size B (about 0.0468 to 0.0625 inch) hoof material;
   about 10% by weight size C (about 0.0312 to 0.0468 inch) hoof material; and
   about 80% by weight size D (about 0.0045 to 0.0312 inch) hoof material.

4. The pet chew according to claim 1 wherein the pet chew has a diameter of about 0.94 inch, a length of about three inches and a bending strength of at least about 950 pounds.

5. The pet chew according to claim 1 wherein solid hoof material comprises cattle hoof material.

6. The pet chew according to claim 1 wherein about 100 to 110 pounds of binder are used for every 1000 pounds of particulate components.

7. The pet chew according to claim 1 wherein said binder is a collagen protein.

8. A method for making a formed hoof material pet chew comprising the following steps:
   selecting hoof material particulate components over a range of particle sizes up to about 0.127 inch, wherein said particulate components comprise 5% by weight size E (about 0.0045 inch and smaller) hoof material;
   adding a binder to said particulate components;
   mixing said particulate components with a sufficient amount of said binder to create a formable particulate components/binder mixture; and
   forming said particulate components/binder mixture into a pet chew.

9. The method according to claim 8 wherein the selecting step is carried out so that said particulate components further comprise:
   about 20% by weight size A (about 0.0625 to 0.127 inch) hoof material;
   about 5% by weight size B (about 0.0468 to 0.0625 inch) hoof material;
   about 10% by weight size C (about 0.0312 to 0.0468 inch) hoof material; and
   about 60% by weight size D (about 0.0045 to 0.0312 inch) hoof material.

10. The method according to claim 8 wherein the selecting step is carried out so that said particulate components further comprise:
    about 5% by weight size B (about 0.0468 to 0.0625 inch) hoof material;
    about 10% by weight size C (about 0.0312 to 0.0468 inch) hoof material; and
    about 80% by weight size D (about 0.0045 to 0.0312 inch) hoof material.

11. The method according to claim 8 wherein said mixing step is carried out using about 100 to 110 pounds binder to about 1000 pounds particulate components.

12. The method according to claim 8 wherein said forming step includes the application of pressure to the particulate components/binder mixture in a cavity of a die.

13. The method according to claim 12 wherein at least a portion of said mixing step is carried out at a temperature of about 170°–180° F.

14. The method according to claim 12 wherein said forming step is carried out with said die at a temperature of about 90°–110° F. for about 1.2 seconds using a 75-ton press to create a single pet chew about seven inches long.

15. The method according to claim 8 wherein said forming step includes the extrusion of the particulate components/binder through a die.

16. The method according to claim 15 wherein said forming step is carried out with said die at a temperature of about 90°–110° F. at pressures of about 1750–1900 psi.

17. The method according to claim 8 further comprising the step of reducing hoof material to said range of particle sizes.

18. The method according to claim 8 wherein the selecting, mixing and forming steps are carried out to produce a pet chew having a diameter of about 0.94 inch, a length of about three inches a bending strength of at least about 950 pounds.

19. A formed hoof material pet chew comprising:
- a hoof material particulate component comprising a range of particle sizes up to about 0.127 inch, wherein said particulate component comprises:
  - about 5% by weight size B (about 0.0468 to 0.0625 inch) hoof material;
  - about 10% by weight size C (about 0.0312 to 0.0468 inch) hoof material; and
  - 5% by weight size E (about 0.0045 inch and smaller) hoof material; and
- a binder binding said particulate components into a shape.

20. The pet chew according to claim 19 wherein said particulate component further comprises
- about 20% by weight size A (about 0.0625 to 0.127 inch) hoof material; and
- about 60% by weight size D (about 0.0045 inch to 0.0312 inch) hoof material.

21. The pet chew according to claim 19 wherein said particulate component further comprises
- about 80% by weight size D (about 0.0045 inch to 0.0312 inch) hoof material.

* * * * *